United States Patent
Kolev et al.

(10) Patent No.: US 10,819,429 B2
(45) Date of Patent: Oct. 27, 2020

(54) FREE-SPACE OPTICAL COMMUNICATION APPARATUS AND METHOD

(71) Applicant: NATIONAL INSTITUTE OF INFORMATION AND COMMUNICATIONS TECHNOLOGY, Koganei-shi, Tokyo (JP)

(72) Inventors: Dimitar Kolev, Tokyo (JP); Morio Toyoshima, Tokyo (JP)

(73) Assignee: NATIONAL INSTITUTE OF INFORMATION AND COMMUNICATIONS TECHNOLOGY, Tokyo (JP)

( * ) Notice: Subject to any disclaimer, the term of this patent is extended or adjusted under 35 U.S.C. 154(b) by 0 days.

(21) Appl. No.: 16/481,103

(22) PCT Filed: Jan. 19, 2018

(86) PCT No.: PCT/JP2018/001562
§ 371 (c)(1),
(2) Date: Jul. 26, 2019

(87) PCT Pub. No.: WO2018/139357
PCT Pub. Date: Aug. 2, 2018

(65) Prior Publication Data
US 2019/0393956 A1     Dec. 26, 2019

(30) Foreign Application Priority Data

Jan. 27, 2017   (JP) .................................. 2017-012949

(51) Int. Cl.
*H04B 10/118* (2013.01)
*H04B 10/40* (2013.01)

(52) U.S. Cl.
CPC ........... *H04B 10/118* (2013.01); *H04B 10/40* (2013.01)

(58) Field of Classification Search
CPC .............................................. H04B 10/11–118
See application file for complete search history.

(56) References Cited

U.S. PATENT DOCUMENTS 6,704,331 B2   3/2004   Payne et al.
7,457,545 B2   11/2008  Wirth et al.
(Continued)

FOREIGN PATENT DOCUMENTS

DE    102013206064 A1   10/2014
JP    2000068934 A      3/2000
(Continued)

OTHER PUBLICATIONS

International Search Report (ISR) (and English language translation thereof) dated Apr. 3, 2018 issued in International Application No. PCT/JP2018/001562.
(Continued)

*Primary Examiner* — Casey L Kretzer
(74) *Attorney, Agent, or Firm* — Holtz, Holtz & Volek PC

(57) ABSTRACT

A free-space optical communication apparatus, transmitting and receiving light waves to and from an artificial satellite orbiting an earth orbit, includes a transmission light wave generating unit generating a transmission light wave to be transmitted to the artificial satellite, a telescope having an aperture for collecting a reception light wave emitted from the artificial satellite, the aperture adapted to collect a path propagation light propagating through a space including a propagation path for correcting an uplink transmission light wavefront generated by the transmission light wave generating unit to the artificial satellite, a wavefront sensor detecting wavefront distortions of the reception light wave (Continued)

and the uplink propagation path, a control unit generating a control signal based on the wavefront distortions, and a deformable mirror correcting the uplink propagation path based on the control signal to guide the transmission light wave to the artificial satellite through the telescope.

16 Claims, 7 Drawing Sheets

(56) References Cited

U.S. PATENT DOCUMENTS

| | | |
|---|---|---|
| 2004/0086282 A1 | 5/2004 | Graves et al. |
| 2004/0114643 A1 | 6/2004 | Payne et al. |
| 2012/0114337 A1 | 5/2012 | Aoki |

FOREIGN PATENT DOCUMENTS

| | | |
|---|---|---|
| JP | 2007506984 A | 3/2007 |
| KR | 20050072765 A | 7/2005 |
| WO | 2009096405 A1 | 8/2009 |
| WO | 2011007658 A1 | 1/2011 |
| WO | 2019074367 A1 | 4/2019 |

OTHER PUBLICATIONS

Written Opinion dated Apr. 3, 2018 issued in International Application No. PCT/JP2018/001562.

Hardy, "Adaptive Optics for Astronomical Telescopes", Oxford University Press, 1998.

FREE-SPACE OPTICAL COMMUNICATION APPARATUS AND METHOD

TECHNICAL FIELD

The present invention relates to free-space optical communication apparatuses and methods for transmitting and receiving light waves to and from an artificial satellite orbiting the earth, and particularly to a free-space optical communication apparatus and a method suitable for improving the connectivity of ground-satellite links especially even under atmospheric fluctuations.

BACKGROUND ART

In recent years, research has been advanced to perform optical satellite communication between a ground station on the earth and an artificial satellite or the like orbiting the earth in space. Such optical satellite communication is capable of large-capacity data transmission, can be realized with a lightweight, compact system configuration, and has also advantages such as less interference compared to using radio waves, so it has attracted attention as technology for future space communication.

Such optical satellite communication has, in an artificial satellite 71 and a ground station 72 as illustrated in FIG. 6, a downlink for optical communication from the artificial satellite 71 to the ground station 72, and an uplink for optical communication from the ground station 72 to the artificial satellite 71. The satellite 71 transmits downlink light waves that are received in the ground station 72 and by the time the uplink light waves reach the satellite 71, the satellite moves to another position. It takes, for example, a few tenths of a second for the light waves to reach a geosynchronous orbit satellite from the ground, taking into account light traveling at a constant speed. For this reason, as illustrated in FIG. 6, even when the uplink light waves are emitted in the same direction as the incident direction of the downlink light waves, the artificial satellite moves in a few tenths of a second. Thus, the artificial satellite 71 cannot be captured within the range of the Isoplanatic Angle $\theta_0$ where it is considered that the wavefronts of both downlink and uplink light waves are identical. In addition to this, the optical satellite communication is clearly affected by the effect of the atmosphere due to fluctuations in the air and the like which cause the fading and the instantaneous interruption of the optical link, thereby disturbing the uplink light waves, resulting in distorted wavefront.

For this reason, various adaptive optics techniques have been conventionally proposed in order to correct the propagation direction of the uplink light waves toward the artificial satellite 71 and to reduce the adverse effect of the atmosphere.

As one of them, as illustrated in FIG. 7, a technique using a laser guide star has been proposed. Specifically, in order to increase the spatial resolution limited by the atmospheric turbulence, a bright star as the laser guide star is generated near the artificial satellite 71 to measure the atmospheric turbulence effect. Then, the spatial resolution is improved by feeding back the measured atmospheric effects to an adaptive optics system in real time.

CITATION LIST

Non Patent Literature

Non-Patent Literature 1: J. Hardy, "Adaptive Optics for Astronomical Telescopes," Oxford University Press, 1998

SUMMARY OF INVENTION

Technical Problem

Incidentally, such a technique using the laser guide star requires another high-power laser installed for transmitting uplink light waves to generate the laser guide star, and then execute the processing operations described above and that leads to more complex ground station, which is a problem. Therefore, to date, there has been a demand for a technique capable of measuring atmospheric effects with the downlink light, received from the satellite without using such the laser guide star and feeding back the measured atmospheric effects to the adaptive optics system for correction.

In particular, it cannot be sensed unless the light from the laser guide star is strong to a certain extent. For this reason, there are problems that it is very difficult to generate the laser guide star; and if it is generated continuously, the laser output also increases and the signal-to-noise ratio (S/N ratio) of the received optical signal for communication decreases, thereby making the system itself complicated.

Therefore, the present invention has been made in view of the above-mentioned problems, and the object thereof is to provide a free-space optical communication apparatus for transmitting and receiving light waves to and from an artificial satellite orbiting an earth orbit, the free-space optical communication apparatus being capable of transmitting uplink light waves with high accuracy and pre-compensated wavefront by measuring the atmospheric effects using the downlink light received from the satellite without using a laser guide star.

Solution to Problem

A free-space optical communication apparatus according to a first invention is a free-space optical communication apparatus for transmitting and receiving light waves to and from an artificial satellite orbiting an earth orbit, the free-space optical communication apparatus including a transmission light wave generating unit configured to generate a transmission light wave to be transmitted to the artificial satellite; a telescope having an aperture for collecting the light waves emitted from the artificial satellite, the aperture being adapted to collect also information for the light propagating path through the atmosphere including the propagation path for the uplink transmission light wave generated by the transmission light wave generating unit to the artificial satellite; a wavefront sensor configured to detect wavefront distortions of the received downlink light wave and the uplink propagation path collected by the telescope; a control unit configured to generate a control signal based on the wavefront distortions detected by the wavefront sensor; and a deformable mirror configured to correct the wavefront in the uplink propagation path based on the control signal generated by the control unit to correct the uplink transmission wavefront to the artificial satellite through the telescope.

In a free-space optical communication apparatus according to a second invention, as set forth in the first invention, the aperture of the telescope has a diameter increased to such an extent that the downlink reception wavefront and the uplink light propagation path wavefront are received.

In a free-space optical communication apparatus according to a third invention, as set forth in the first invention, the telescope collects each of the downlink reception wavefront and the uplink propagation path wavefront through apertures different from one another.

In a free-space optical communication apparatus according to a fourth invention, as set forth in the first to third inventions, the control unit detects atmospheric information of the space including the uplink propagation path wavefront distortion, and generates the control signal for correcting the propagation path based on the detected atmospheric information.

In a free-space optical communication apparatus according to a fifth invention, as set forth in the first to fourth inventions, the respective wavefront distortions of the reception light wave and the uplink propagation path are detected through a plurality of wavefront sensors different from each other.

A free-space optical communication method according to a sixth invention is a free-space optical communication method for transmitting and receiving light waves to and from an artificial satellite orbiting an earth orbit, the free-space optical communication method including a transmission light wave generating step of generating a transmission light wave to be transmitted to the artificial satellite; a light collecting step of collecting the downlink light wave emitted from the artificial satellite and the propagation path light propagating through a space including a propagation path for correcting the uplink transmission light wave generated by the transmission light wave generating unit to the artificial satellite through a telescope having an aperture; a detecting step of detecting wavefront distortions of the downlink light wave and the uplink propagation path wavefront collected at the light collecting step; a control step of generating a control signal based on the wavefront distortions detected at the detecting step; and a correcting step of correcting the propagation path based on the control signal generated at the control step to correct the uplink transmission wavefront to the artificial satellite through the telescope.

Advantageous Effects of Invention

According to the present invention having the above-described configuration, there is provided an adaptive optics system capable of selecting a propagation path of a transmission light wave Tx taking into consideration the effects of atmospheric turbulence, fading, and the like, without generating a laser guide star as in the conventional systems. As a result, it is possible to transmit the transmission light wave Tx for uplink toward an artificial satellite with high accuracy. Further, since it is not necessary to mount an adaptive optics system in which a laser guide star is generated, it is also possible to provide a simple configuration without complicating the system configuration of the free-space optical communication apparatus. In addition to this, according to the present invention, it is possible to reliably transmit the transmission light wave Tx to the artificial satellite while reducing the transmission power of the transmission light wave Tx for uplink.

DESCRIPTION OF EMBODIMENT(S)

Embodiments of the present invention will be described below in detail with reference to the drawings.

Figure 1:
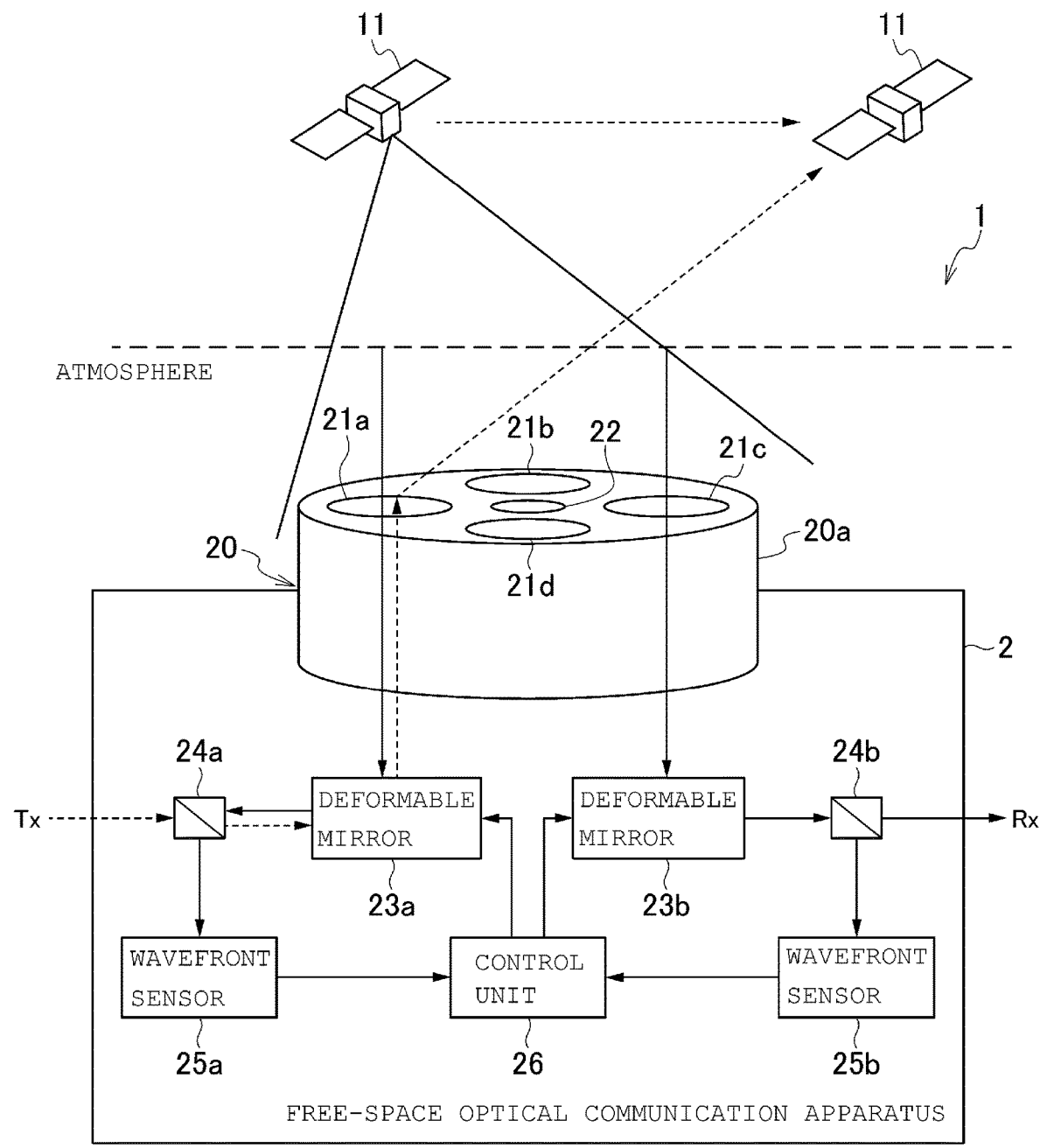
FIG. 1 is a diagram illustrating a configuration example of a space communication system to which a free-space optical communication apparatus according to the present invention is applied.

FIG. 1 illustrates a configuration example of a space communication system 1 to which a free-space optical communication apparatus 2 according to the present invention is applied. The space communication system 1 includes an artificial satellite 11 and the free-space optical communication apparatus 2.

The satellite 11 is a satellite that orbits a geostationary orbit (GEO: Geostationary Earth Orbit), which is a geosynchronous orbit as an earth orbit having an orbital period coincident with the earth's rotation period, that orbits a low orbit (LEO: Low Earth Orbit) or a medium orbit (MEO: Medium Earth Orbit), i.e., independently of the earth's rotation period, or that flies in deep space and the like. The artificial satellite 11 may be launched for any application. The artificial satellite 11 is also not limited to those orbiting GEO, LEO, and MEO, but is a concept including any other satellite flying in space.

The free-space optical communication apparatus 2 transmits and receives an optical signal to and from the artificial satellite 11. The free-space optical communication apparatus 2 may be embodied as a telescope. The free-space optical communication apparatus 2 is connected to other objects, such as a gateway, a ground communication network installed on the ground, and a communication body such as a vehicle, a ship, and an aircraft, to transmit and receive an optical signal. In other words, the gateway, the ground communication network, the communication body, and the like transmit and receive optical signals to and from the artificial satellite 11 via the free-space optical communication apparatus 2.

As illustrated in FIG. 1, the free-space optical communication apparatus 2 includes a telescope 20 in which a plurality of apertures 21a to 21d and a secondary mirror 22 are formed on the tip end surface of its lens barrel, deformable mirrors 23a and 23b formed at a proximal end portion of the telescope 20, light separation units 24a and 24b provided downstream of the deformable mirrors 23a and 23b, wavefront sensors 25a and 25b provided downstream of the light separation units 24a and 24b, and a control unit 26 connected to the wavefront sensors 25a and 25b and the deformable mirrors 23a and 23b. Although the deformable mirror 23a, the light separation unit 24a, the wavefront sensor 25a, the deformable mirror 23b, the light separation unit 24b, and the wavefront sensor 25b are illustrated separately, they can be provided as one system.

It is noted that the configuration of the secondary mirror 22 in the telescope 20 may be eliminated.

Figure 2:
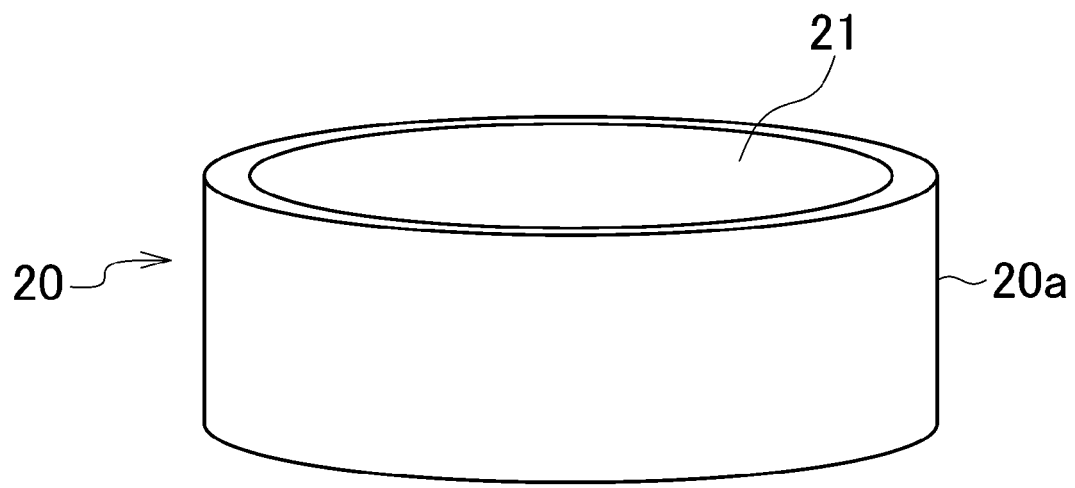
FIG. 2 is a diagram illustrating another configuration example of a telescope.

The telescope 20 is adjusted by a pedestal (not illustrated) so that the longitudinal direction of the lens barrel 20a is directed to the flight direction of the artificial satellite 11. The apertures 21a to 21d are provided around the sub mirror 22 formed on the end face of the lens barrel 20a to actually collect or emit an optical signal from or to the artificial satellite 11. Incidentally, the apertures 21 through which optical signals are incident from or emitted to the artificial satellite 11 are not limited to the case of being embodied as a plurality of small apertures. In place of the apertures 21, a single large aperture formed on substantially the entire end face of the lens barrel 20a may be embodied as illustrated in FIG. 2. Each aperture 21 has a lens to play a role of expanding or reducing the focal point of the light to be incident or emitted, as a matter of course.

That is, the telescope 20 is used not only in the downlink for optical communication from the artificial satellite 11 to the free-space optical communication apparatus 2, but also in the uplink for optical communication from the free-space optical communication apparatus 2 to the artificial satellite 11. In other words, there is an advantage that the system itself can be simplified in that an additional telescope for uplink is not required but the telescope for downlink normally used is shared as it is.

It is noted that the configuration of the telescope 20 is not limited to the above-described example, and may be embodied by any existing telescope.

The deformable mirrors 23a and 23b are configured so that the orientation of the reflecting surfaces of the mirrors becomes constant with respect to the projectile by a tracking function of the pedestal of the telescope 20. The orientation and shape of the mirror reflecting surfaces of the deformable mirrors 23a and 23b are controlled based on the control signal transmitted from the control unit 26 so as be freely deformed. Further, controlling the mirror reflecting surfaces of the deformable mirrors 23a and 23b makes it is possible to control the transmission wave Tx in the direction of the artificial satellite 11. The deformable mirrors 23a and 23b can also finely adjust the propagation path of the transmission light wave Tx based on the control signal described above.

The light separation units 24a and 24b are configured by a beam splitter, a half mirror, and the like. The light separation unit 24a reflects a reception light wave Rx reflected by the deformable mirror 23a and guides the reflected light wave Rx to the wavefront sensor 25a. Further, the light separation unit 24a passes the transmission light wave Tx propagated from the outside as it is to guide it to the deformable mirror 23a. The light separation unit 24b passes a part of the reception light wave Rx reflected by the deformable mirror 23b to guide it to the outside, and reflects another part of the reception light wave Rx to guide it to the wavefront sensor 25b. By introducing such light separating sections 24a and 24b, it is possible to receive the propagation path wavefront of the light propagated in a space including a propagation path P3 of the transmission light wave Tx, as well as the reception light wave Rx, by the single telescope 20 and to separate the propagation-path wavefronts. The transmission light wave Tx is transmitted in the state where the transmission light axis of the transmission light wave Tx is biased with respect to the reception light axis of the reception light wave Rx by an estimated angle based on the speed of the satellite from the calculation of the orbit of the satellite and the like by the deformable mirror 23a and an optical system for the transmission light wave Tx (not illustrated).

The wavefront sensors 25a and 25b are devices for measuring wavefront distortion (aberration) in real time. The wavefront sensor 25a measures the wavefront distortion of the reception light wave from the light separation unit 24a and transmits the measurement result to the control unit 26. The wavefront sensor 25b also measures the wavefront distortion of the reception light wave from the light separation unit 24b and transmits the measurement result to the control unit 26.

The control unit 26 receives the measurement result of the wavefront distortion transmitted from the wavefront sensors 25a and 25b. The control unit 26 generates a control signal for controlling the deformable mirrors 23a and 23b based on the transmitted measurement result of the wavefront distortion. The control unit 26 transmits the generated control signal to the deformable mirrors 23a and 23b.

The transmission light wave Tx propagating toward the light separation unit 24a is generated in the above-mentioned, not-illustrated gateway, ground communication network, communication body, and the like. On the other hand, the reception light wave Rx passing through the light separation unit 24b is transmitted to the above-mentioned, not-illustrated gateway, ground communication network, communication body, and the like.

Next, a processing operation method for the free-space optical communication apparatus 2 having the above-described configuration will be described.

Figure 3:
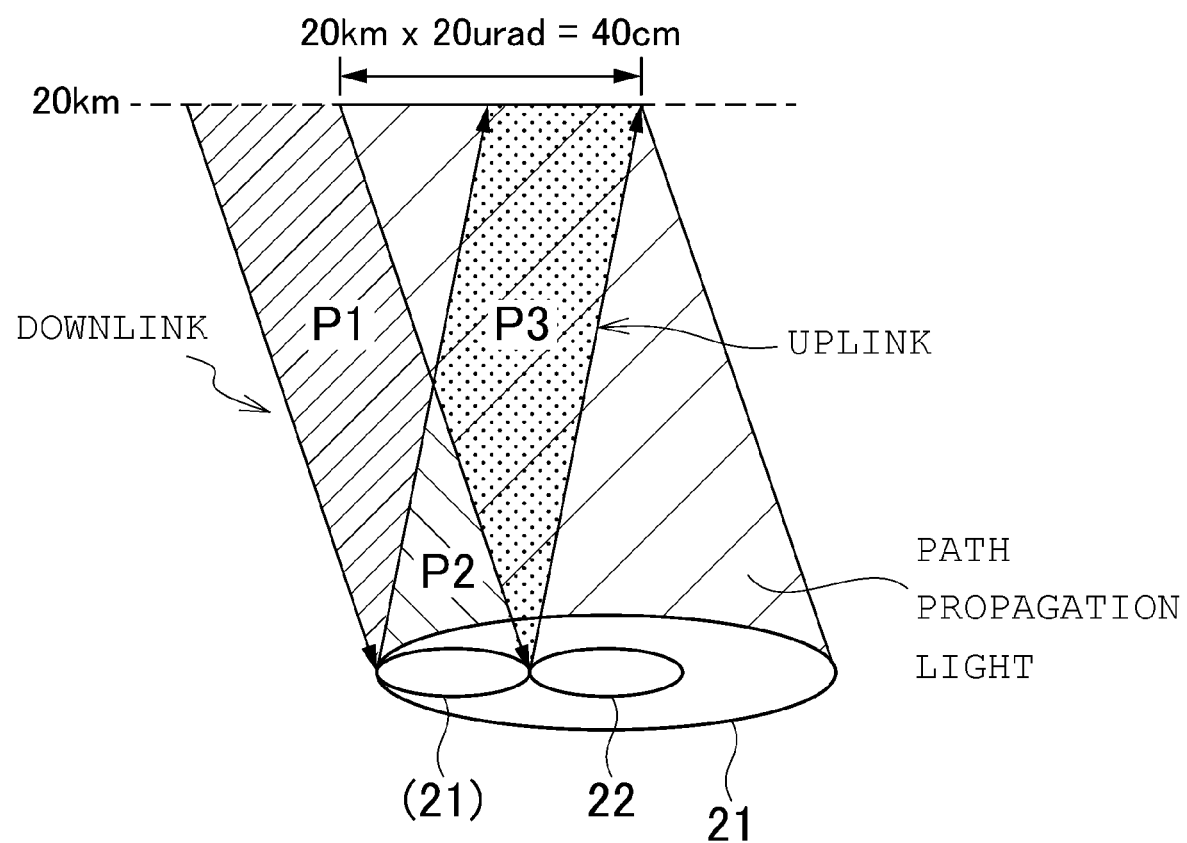
FIG. 3 is a diagram for describing propagation paths for downlink and uplink.

FIG. 3 illustrates propagation paths for downlink of optical communication from the artificial satellite 11 to the free-space optical communication apparatus 2 and for uplink of optical communication from the free-space optical communication apparatus 2 to the artificial satellite 11.

It takes a few tenths of a second, taking into account light traveling at a constant speed, from the transmission of the reception light wave Rx for downlink from the artificial satellite 11 to the free-space optical communication apparatus 2 to the arrival of the transmission light wave Tx for uplink transmitted from the free-space optical communication apparatus 2 in response to receiving the reception light wave Rx to the artificial satellite 11. For this reason, as illustrated in FIG. 3, even when the transmission light wave Tx for uplink is emitted in the same direction as the incident direction of the reception light wave Rx for downlink, the artificial satellite moves in a few tenths of a second. For this reason, as illustrated in FIG. 3, the propagation path of the transmission light wave Tx for uplink is different from the propagation path of the reception light wave Rx for downlink, and they are mutually offset by a predetermined angle.

As a result, the propagation path of the transmission light wave Tx for uplink and the propagation path of the reception light wave Rx for downlink overlap in a space P2. On the other hand, a space P1 is a propagation space for only the reception light wave Rx for downlink, and a space P3 is a propagation space for only the transmission light wave Tx for uplink.

For this reason, what is meant by receiving only the reception light wave Rx for downlink is the state where only the light (electromagnetic wave) propagating through the spaces P1 and P2 in FIG. 3 is received but the information of the light (electromagnetic wave) in the space P3 is not received. Therefore, it is impossible to acquire the information (hereinafter referred to as atmospheric information) of light (electromagnetic wave) on which the effects such as atmospheric fluctuations which cause the fading and instantaneous interruption of the optical link in the space P3 are reflected. In particular, although the transmission light wave Tx for uplink is affected less by atmospheric fluctuations as it arrives at an upper layer, the time for and distance of propagating through the space P3 rather than the space P2 become longer depending on the condition of the speed of the projectile.

For this reason, in the present invention, by receiving the reception light wave Rx for downlink, the atmospheric information of the space P3 is acquired together with the atmospheric information for the spaces P1 and P2 is acquired. Then, based on the acquired atmospheric information, the propagation path of the transmission light wave Tx for uplink is corrected.

Actually, the atmospheric information of the spaces P1 and P2 can be acquired by receiving the reception light wave Rx for downlink as described above, but the atmospheric information of the space P3 is acquired by receiving the path propagation light illustrated in FIG. 3. The path propagation light includes any light (electromagnetic wave) as long as it propagates through the space including the propagation path P3 of the transmission light wave Tx. The path propagation light is not limited to that which includes the entire space P3, but it may include part of the space P3.

Figure 4:
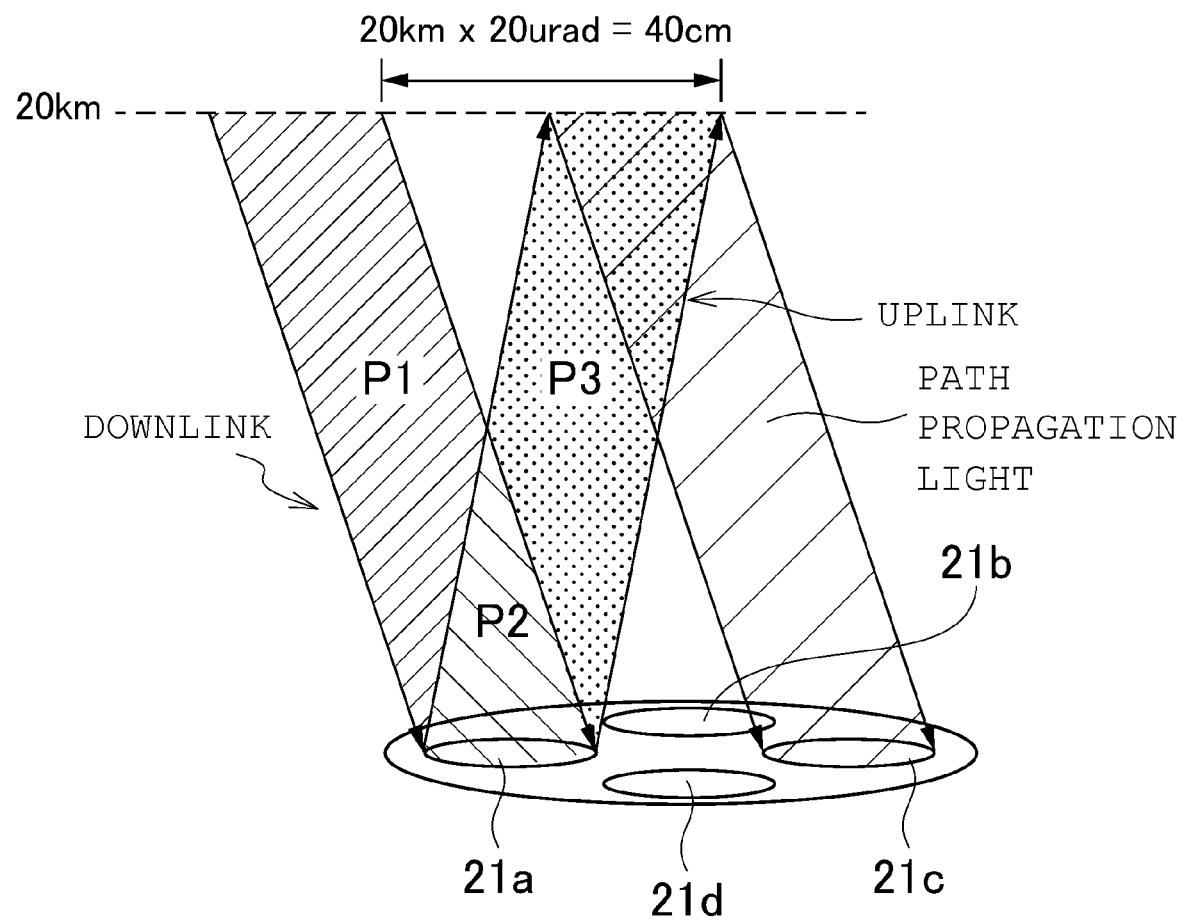
FIG. 4 is a diagram illustrating another aspect of receiving reception light waves and path propagation light.

In order to receive such path propagation light, as illustrated in FIG. 2, one large aperture 21 formed in the tip end surface of the lens barrel of the telescope 20 may be provided so that the reception light wave Rx for downlink and part or all of the path propagation light are received. Alternatively, as illustrated in FIG. 4, the plurality of apertures 21a to 21d may be provided so that the reception light wave Rx for downlink and part or all of the path propagation light are received.

As illustrated in FIG. 3, the range of acquiring the reception light wave Rx and the propagation path light may be considered mainly a range of 20 km from the ground mainly affected by at least the atmosphere. For example, if a difference in angle between the propagation path of the reception light wave Rx for downlink and the propagation path of the transmission light wave Tx for uplink is 20 μrad, it is understood that the aperture 21 needs to be enlarged by 20 km×20 μrad=40 cm.

In the embodiment illustrated in FIG. 3, the example in which the downlink light wave and the uplink light wave are transmitted and received through the same aperture 21 as illustrated in FIG. 2 has been described, but the invention is not limited thereto. For example, the reception light wave Rx may be received by the one aperture 21a and the transmission light wave Tx may be transmitted through the other one aperture 21d.

Thus, both the reception light wave Rx and the path propagation light received through the aperture 21 are transmitted to the deformable mirrors 23a and 23b.

Among them, the reception light wave Rx is reflected by the deformable mirror 23b, and a part thereof passes through the light separation unit 24b as it is and is transmitted to an external gateway, a ground communication network, a communication body or the like. Further, the other part of the reception light wave Rx is reflected by the light separation unit 24b and reaches the wavefront sensor 25b.

On the other hand, the path propagation light is bent by the deformable mirrors 23a and 23b, then reflected by the light separation units 24a and 24b, and reaches the wavefront sensors 25a and 25b.

When the reception light wave Rx and the path propagation light reach the wavefront sensors 25a and 25b, their wavefront distortions are detected therein. It becomes possible to acquire atmospheric information based on atmospheric fluctuations or the like in the propagation path of the reception light wave Rx from the detected wavefront distortion. Further, it becomes possible to acquire atmospheric information based on atmospheric fluctuations or the like in the propagation path of the path propagation light from the detected wavefront distortion.

The wavefront sensors 25a and 25b transmit, to the control unit 26, the wavefront distortions of the reception light wave Rx and the path propagation light on which the atmospheric information is reflected.

The control unit 26 can acquire atmospheric information of the reception light wave Rx and the path propagation light from the received wavefront distortions. As a result, it is possible to determine the atmospheric information of the spaces P2 and P3 included in the propagation path of the transmission light wave Tx to be transmitted toward the artificial satellite 11 from now.

Figure 5:
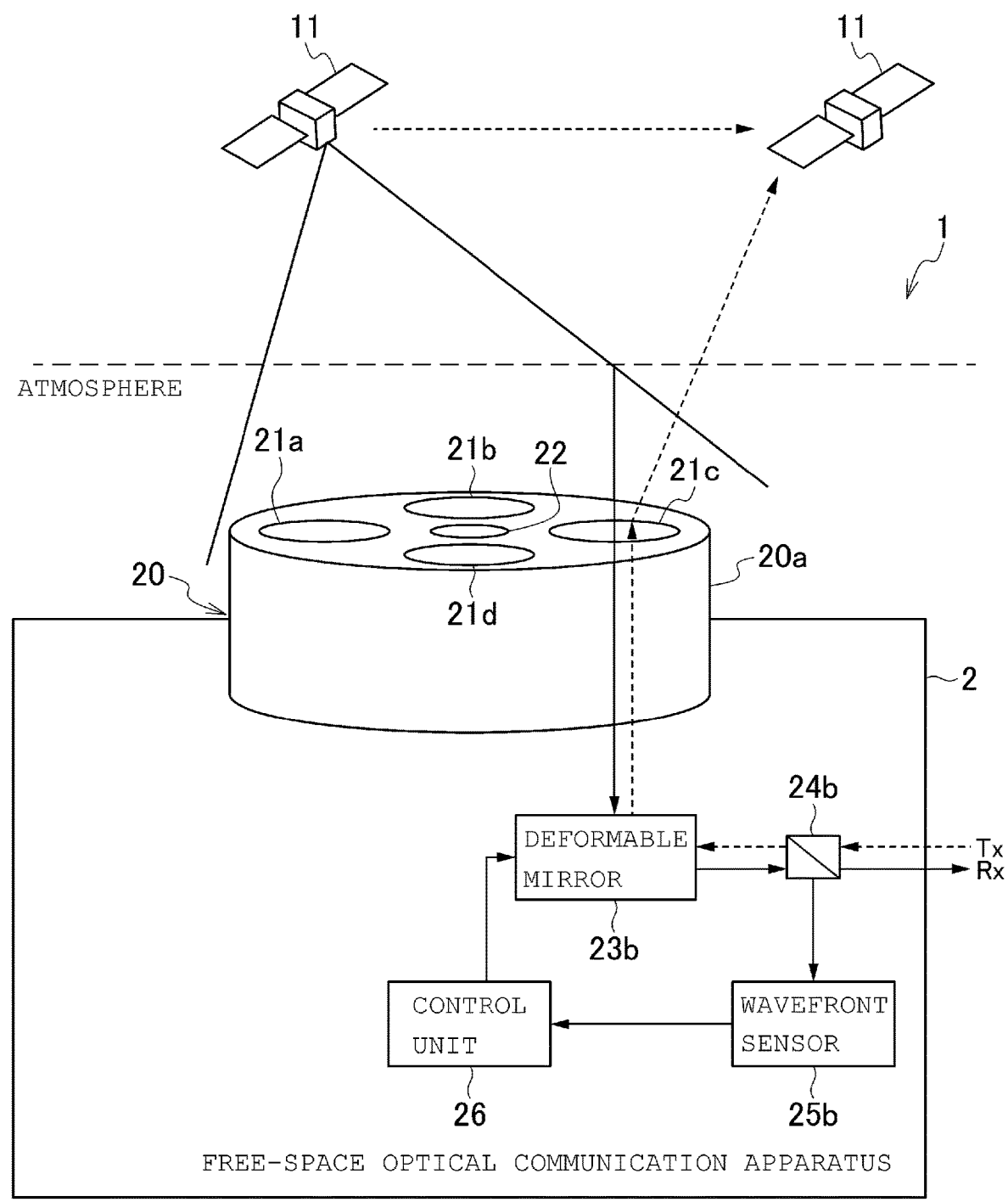
FIG. 5 is a view for describing another embodiment of a space communication system to which the free-space optical communication apparatus according to the present invention is applied.
Figure 6:
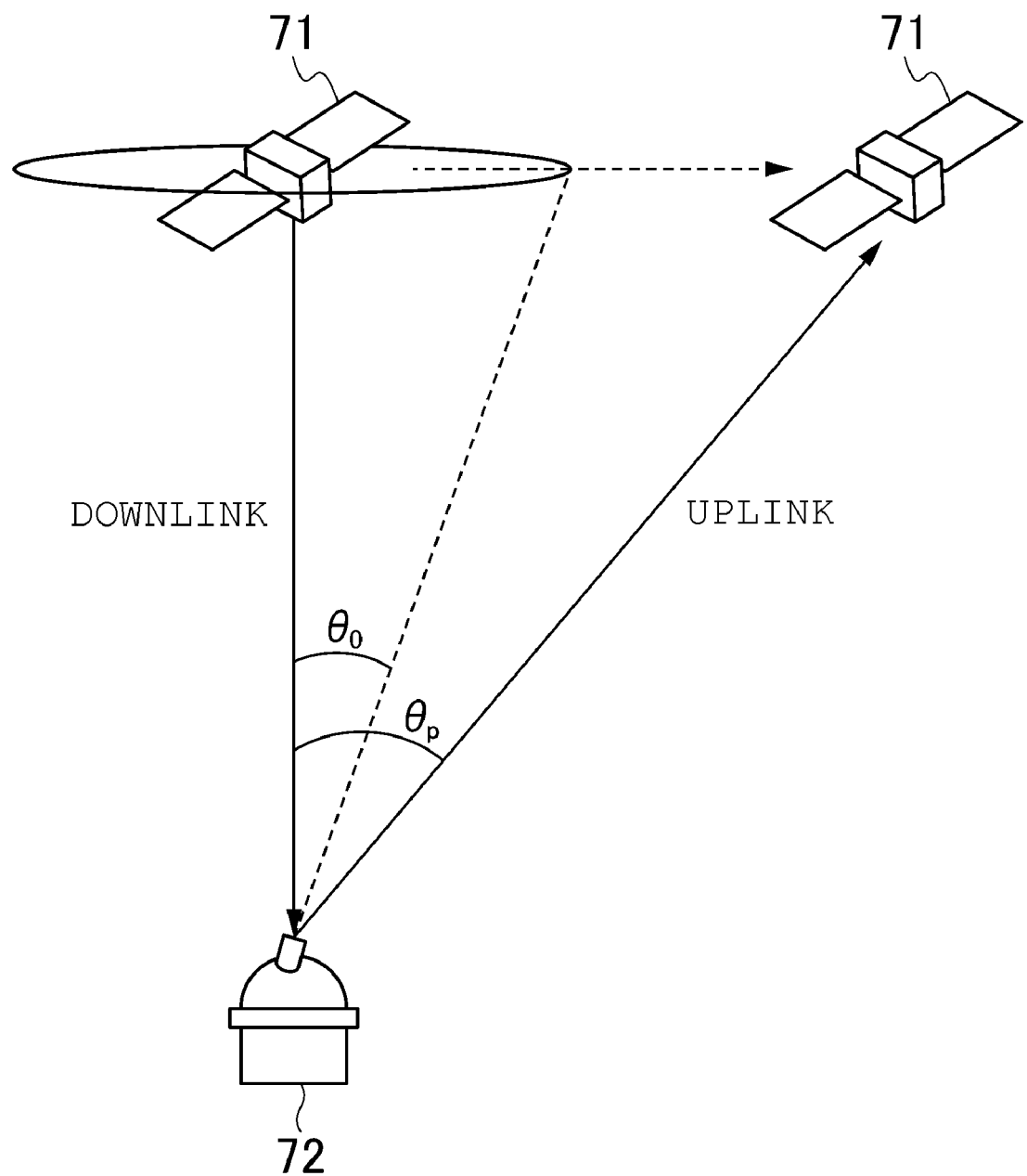
FIG. 6 is a diagram for describing a general concept of optical space communication.
Figure 7:
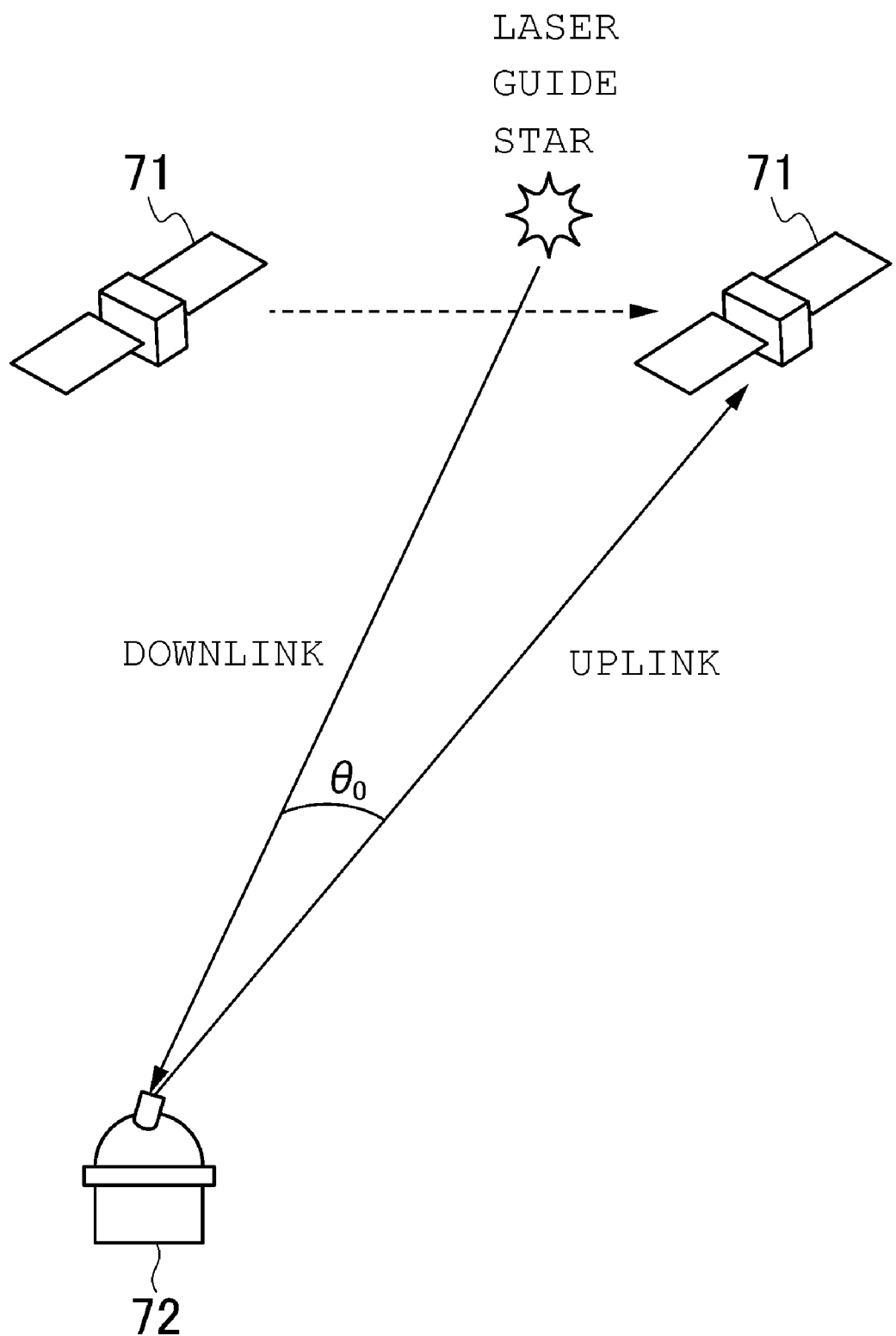
FIG. 7 is a diagram for describing an example of measuring an atmospheric fluctuation using a laser guide star.

It is noted that the embodiment illustrated in FIG. 1 is merely an example, and the configuration of the deformable mirror 23a, the light separation unit 24a, and the wavefront sensor 25a may be eliminated so that only the deformable mirror 23b, the light separation unit 24b, and the wavefront sensor 25b perform the processing operation described above, as illustrated in FIG. 5. In such a case, the reception light wave Rx and the propagation path light are reflected by the deformable mirror 23b, the reception light wave Rx and the propagation path light are separated by the light separation unit 24b, and the path propagation light separated is received by the wavefront sensor 25b. At this time, part of the reception light wave Rx may be also received by the wavefront sensor 25b. The operation of the control unit 26 is the same as described above.

Further, the same wavefront sensor 25b is used between the transmission light wave Tx and the light separation unit 24b, but another deformable mirror for only the reception light wave Rx may be inserted therebetween separately from the common deformable mirror 23b in order to increase the collection efficiency of the reception light wave Rx.

As another variation, three or more sets each including the deformable mirror 23, the light separation unit 24, and the wavefront sensor 25 may be provided so that each set is arranged to be continuous to the control unit.

A method of determining the atmospheric information is determination using the wavefront distortion. At this time, the determination may be made from various data such as the magnitude of the wavefront distortion, the fluctuation speed, and the dispersion degree.

Next, when the transmission light wave Tx is generated by an external gateway, a ground communication network, or a communication body, it is transmitted through the light separation unit 24a to the deformable mirror 23a. In such a case, the control unit 26 generates a control signal based on the atmospheric information determined as described above. The control signal is generated based on the identified wavefront distortions. The wavefront distortions also include information on the light reception angles of the reception light wave Rx and the propagation path light at the deformable mirrors 23a and 23b. Furthermore, these wavefront distortions are those on which the atmospheric information is reflected. Thus, by identifying the wavefront distortions, it is possible to indirectly identify the reception angles of the reception light wave Rx and the propagation path light on which the wavefront distortions are reflected and the atmospheric information.

A control signal for changing the propagation path of the transmission light wave Tx emitted from the telescope 20 is generated based on the wavefront distortions, specifically based on the result of indirectly determining the atmospheric information to which the wavefront distortions are reflected. The basis for changing the propagation path is the light reception angles of the original reception light wave Rx and propagation path light, and light reception angles can also be acquired using the wavefront distortions. As to how much the angle of the propagation path is to be changed, a calibration curve or conversion equation with the wavefront distortion may be prepared in advance based on measured values in the past, etc. so that the actual propagation path of the transmission light wave Tx is determined based on the prepared calibration curve or conversion equation. That is, the control unit 26 may have any configuration as long as it detects the atmospheric information such as atmospheric fluctuations in the space including the spaces P2 and P3 using the wavefront distortions, and generates a control signal for correcting the propagation path based on the detected atmospheric information. Moreover, the control unit 26 may have any configuration as long as it calculates the angle of the propagation path from the measured wavefront distortion.

The deformable mirror 23a can receive from the control unit 26 a control signal that is generated to reduce the influence of atmospheric fluctuations and fading, and determine based on the control signal the angle of the propagation path of the transmission light wave Tx. As a result, the transmission light wave Tx emitted from the telescope 20 propagates in the propagation path in which the influence of atmospheric fluctuations and fading is taken into consideration, and then arrives at the artificial satellite 11.

Therefore, the free-space optical communication apparatus 2 to which the present invention is applied makes it possible to provide an adaptive optics system capable of selecting a propagation path of a transmission light wave Tx taking into consideration the effects of atmospheric fluctuation, fading, and the like, without generating a laser guide star as in the conventional systems. As a result, it is possible to transmit the transmission light wave Tx for uplink toward the artificial satellite 11 with high accuracy.

It is noted that the present invention is not limited to the above-described embodiments, and may be configured to acquire the atmospheric information based on only the information of the path propagation light with eliminating the information of the reception light wave Rx. Thus, the control signal is generated based on the atmospheric information of only the space P3, but the same effect can be obtained even in such a case.

Further, in the embodiments described above, the case where the two wavefront sensors 25a and 25b are used has been described as an example, but the present invention is not limited thereto, and any number of them may be used as long as it is one or more.

Further, the control unit 26 may generate a control signal for correcting the propagation path of the reception light wave Rx for downlink based on the wavefront distortion of the reception light wave Rx. By acquiring the atmospheric information of the propagation path of the reception light wave Rx and generating the control signal for correcting the atmospheric information, it becomes possible to correct the propagation path of the reception light wave Rx so that the influence of fluctuations in the air can be removed.

It is noted that the present invention is not limited to the embodiments described above. The free-space optical communication apparatus 2 is not limited to the case where it is installed on the ground, and may be mounted in another communication body, including a vehicle, a ship, an aircraft, and the like, which transmits and receives optical signals for downlink and uplink to and from the artificial satellite 11. In this case, it is possible to transmit and receive optical signals to and from the other communication body by mounting therein an apparatus that matches the conditions with the free-space optical communication apparatus 2.

According to the present invention configured as described above, it is possible to more reliably prevent the propagation path of the transmission light wave Tx for uplink to be shifted due to the influence of the atmosphere and to be dispersed accordingly. Normally, the power of the transmission light wave Tx has to be increased in consideration of dispersion of the transmission light wave Tx for uplink due to the influence of the atmosphere, but the present invention does not require to force the power of the transmission light wave Tx to increase. As a result, it is possible to reduce the transmission power of the transmission light wave Tx.

Further, the present invention makes it possible to solve the problem that it is difficult to correct the laser due to atmospheric fluctuations in a spatially uncorrelated angle or more, which is above the Isoplanatic Angle $\theta_0$, and not to require to force a laser guide star to change in real time for use within the Isoplanatic Angle $\theta_0$ angle as in the prior art, and accordingly to reduce the system load.

REFERENCE SIGNS LIST

1 SPACE COMMUNICATION SYSTEM
2 FREE-SPACE OPTICAL COMMUNICATION APPARATUS
11 SATELLITE
20 TELESCOPE
21 APERTURE
22 SUB MIRROR
23 DEFORMABLE MIRROR
24 LIGHT SEPARATION UNIT
25 WAVEFRONT SENSOR
26 CONTROL UNIT
71 SATELLITE
72 GROUND STATION
P1 TO P3 SPACE
Rx RECEPTION LIGHT WAVE
Tx TRANSMISSION LIGHT WAVE

The invention claimed is:

1. A free-space optical communication apparatus for transmitting and receiving light waves to and from an artificial satellite orbiting an earth orbit, the free-space optical communication apparatus comprising:
a transmission light wave generating unit configured to generate an uplink transmission light wave to be transmitted to the artificial satellite through an uplink propagation path;
a telescope having an aperture for collecting downlink light emitted from the artificial satellite, wherein the downlink light emitted from the artificial satellite and collected through the aperture includes (i) a downlink reception light wave that propagates through a downlink propagation path and (ii) a path propagation light that propagates through a space including at least a part of the uplink propagation path through which the uplink transmission light wave generated by the transmission light wave generating unit is to be transmitted to the artificial satellite, wherein said at least a part of the uplink propagation path does not overlap with the downlink propagation path through which the downlink reception light wave propagates;
a wavefront sensor configured to detect wavefront distortions of the downlink reception light wave and the path propagation light collected by the telescope;
a control unit configured to generate a control signal based on at least the wavefront distortion of the path propagation light detected by the wavefront sensor; and
a deformable mirror configured to correct the uplink propagation path based on the control signal generated by the control unit to guide the uplink transmission light wave to the artificial satellite through the telescope and via the corrected uplink propagation path.

2. The free-space optical communication apparatus according to claim 1, wherein the aperture of the telescope has a diameter that is large enough such that the downlink reception light wave propagating through the downlink propagation path and the path propagation light propagating through the space including said at least a part of the uplink propagation path through which the uplink transmission light wave generated by the transmission light wave generating unit is to be transmitted to the artificial satellite, are received simultaneously.

3. The free-space optical communication apparatus according to claim 2, wherein the control unit determines atmospheric information of the space including said at least a part of the uplink propagation path based on the detected wavefront distortion of the path propagation light detected by the wavefront sensor, and generates the control signal for correcting the uplink propagation path of the uplink transmission light wave to be transmitted based on the determined atmospheric information.

4. The free-space optical communication apparatus according to claim 3, wherein the wavefront sensor comprises a plurality of wavefront sensors, and the respective wavefront distortions of the downlink reception light wave and the path propagation light are detected by different wavefront sensors among the plurality of wavefront sensors.

5. The free-space optical communication apparatus according to claim 3, wherein the control unit determines second atmospheric information of at least a part of the downlink propagation path, said part of the downlink propagation path overlapping with the uplink propagation path, based on the detected wavefront distortion of the downlink reception light wave detected by the wavefront sensor, and generates the control signal for correcting the uplink propagation path of the uplink transmission light wave to be transmitted based further on the determined second atmospheric information.

6. The free-space optical communication apparatus according to claim 2, wherein the wavefront sensor comprises a plurality of wavefront sensors, and the respective wavefront distortions of the downlink reception light wave and the path propagation light are detected by different wavefront sensors among the plurality of wavefront sensors.

7. The free-space optical communication apparatus according to claim 1, wherein the aperture comprises a plurality of apertures, and the telescope collects each of the downlink reception light wave and the path propagation light through apertures different from one another from among the plurality of apertures.

8. The free-space optical communication apparatus according to claim 7, wherein the control unit determines atmospheric information of the space including said at least a part of the uplink propagation path based on the detected wavefront distortion of the path propagation light detected by the wavefront sensor, and generates the control signal for correcting the uplink propagation path of the uplink transmission light wave to be transmitted based on the determined atmospheric information.

9. The free-space optical communication apparatus according to claim 8, wherein the wavefront sensor comprises a plurality of wavefront sensors, and the respective wavefront distortions of the downlink reception light wave and the path propagation light are detected by different wavefront sensors among the plurality of wavefront sensors.

10. The free-space optical communication apparatus according to claim 8, wherein the control unit determines second atmospheric information of at least a part of the downlink propagation path, said part of the downlink propagation path overlapping with the uplink propagation path, based on the detected wavefront distortion of the downlink reception light wave detected by the wavefront sensor, and generates the control signal for correcting the uplink propagation path of the uplink transmission light wave to be transmitted based further on the determined second atmospheric information.

11. The free-space optical communication apparatus according to claim 7, wherein the wavefront sensor comprises a plurality of wavefront sensors, and the respective wavefront distortions of the downlink reception light wave and the path propagation light are detected by different wavefront sensors among the plurality of wavefront sensors.

12. The free-space optical communication apparatus according to claim 1, wherein the control unit determines atmospheric information of the space including said at least a part of the uplink propagation path based on the detected wavefront distortion of the path propagation light detected by the wavefront sensor, and generates the control signal for correcting the uplink propagation path of the uplink transmission light wave to be transmitted based on the determined atmospheric information.

13. The free-space optical communication apparatus according to claim 12, wherein the wavefront sensor comprises a plurality of wavefront sensors, and the respective wavefront distortions of the downlink reception light wave and the path propagation light are detected by different wavefront sensors among the plurality of wavefront sensors.

14. The free-space optical communication apparatus according to claim 12, wherein the control unit determines second atmospheric information of at least a part of the downlink propagation path, said part of the downlink propagation path overlapping with the uplink propagation path, based on the detected wavefront distortion of the downlink reception light wave detected by the wavefront sensor, and generates the control signal for correcting the uplink propagation path of the uplink transmission light wave to be transmitted based further on the determined second atmospheric information.

15. The free-space optical communication apparatus according to claim 1, wherein the wavefront sensor comprises a plurality of wavefront sensors, and the respective wavefront distortions of the downlink reception light wave and the path propagation light are detected by different wavefront sensors among the plurality of wavefront sensors.

16. A free-space optical communication method for transmitting and receiving light waves to and from an artificial satellite orbiting an earth orbit, the free-space optical communication method comprising:
  generating a transmission light wave to be transmitted to the artificial satellite though an uplink propagation path;
  collecting, through an aperture of a telescope, downlink light emitted from the artificial satellite, wherein the downlink light emitted from the artificial satellite and collected through the aperture includes (i) a downlink reception light wave that propagates through a downlink propagation path and (ii) a path propagation light that propagates through a space including at least a part of the uplink propagation path through which the uplink transmission light wave generated in the generating is to be transmitted to the artificial satellite, wherein said at least a part of the uplink propagation path does not overlap with the downlink propagation path through which the downlink reception light wave propagates;

detecting wavefront distortions of the collected downlink reception light wave and the collected path propagation light;

generating a control signal based on at least the detected wavefront distortion of the path propagation light; and correcting, by a deformable mirror, the uplink propagation path based on the generated control signal to guide the uplink transmission light wave to the artificial satellite through the telescope and via the corrected uplink propagation path.

\* \* \* \* \*